No. 620,003. Patented Feb. 21, 1899.
W. J. THOMPSON.
DRIVING GEAR FOR BICYCLES.
(Application filed Jan. 8, 1898.)
(No Model.)

Witnesses
J. B. Keefer
Philip N. Tilden

Inventor
William J. Thompson
By James L. Norris
Atty

THE NORRIS PETERS CO., PHOTO-LITHO., WASHINGTON, D. C.

UNITED STATES PATENT OFFICE.

WILLIAM JAMES THOMPSON, OF WEST KOGARAH, NEW SOUTH WALES.

DRIVING-GEAR FOR BICYCLES.

SPECIFICATION forming part of Letters Patent No. 620,003, dated February 21, 1899.

Application filed January 8, 1898. Serial No. 666,063. (No model.)

*To all whom it may concern:*

Be it known that I, WILLIAM JAMES THOMPSON, civil engineer, a subject of the Queen of Great Britain, residing at Warialda street, West Kogarah, near Sydney, in the British Colony of New South Wales, have invented a new and useful Improved Duplex Driving-Gear for Bicycles and the Like, of which the following is a specification.

This invention refers to an improved duplex driving-wheel and connections specially devised to provide interchangeable high gearing and low gearing for bicycles, though it may equally as well be used on other cycles and for other purposes.

An improved duplex driving-gear constructed according to this invention has a rim-wheel or sprocket having internal teeth gearing with a series of toothed pinions in gear with a toothed wheel on the axle, which toothed pinions thus support the rim-wheel or sprocket in its proper position and, when desired, revolve said rim-wheel or sprocket. It has a locking-plate and a spring locking-pin adapted to the plate to lock the central toothed wheel to the revolving or crank disk and the pin to actuate the plate and release it from the teeth of the central toothed wheel and to lock said central toothed wheel to the frame of the cycle or stationary part of other mechanism. It has also connections to the handle part of the cycle for the purpose of controlling the movement of the spring locking-pin; but in order that this invention may be clearly understood reference will now be made to the drawings herewith, in which—

Figure 1:
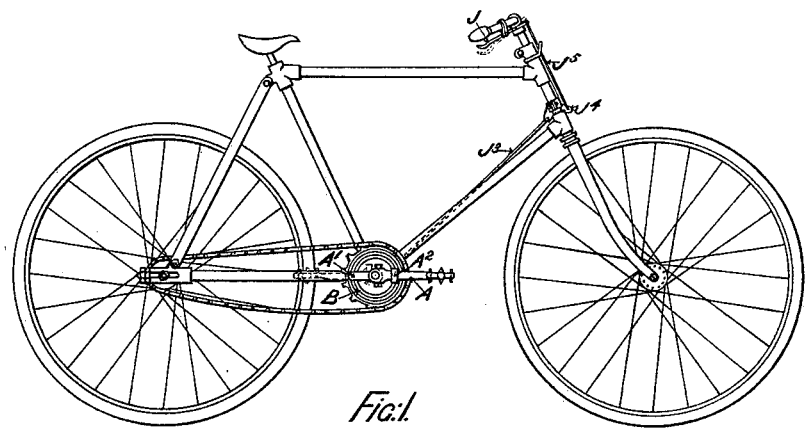
Figure 2:
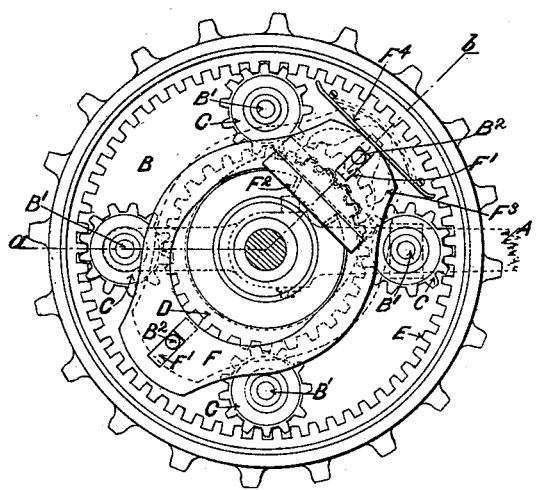
Figure 3:
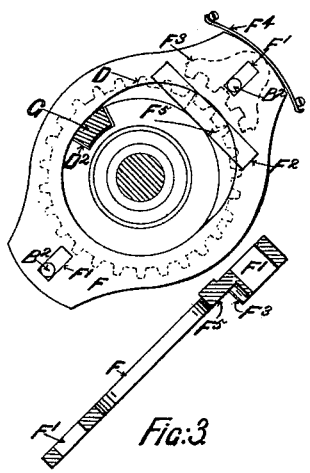
Figure 4:
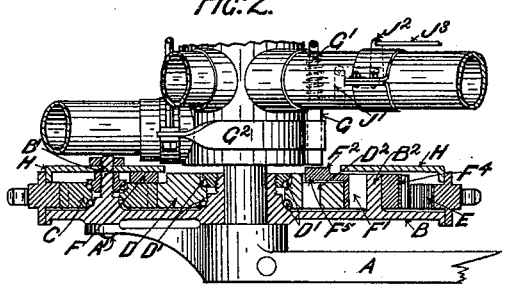
Figure 5:
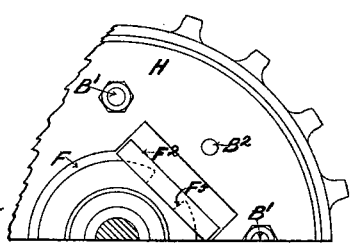

Figure 1 is an elevation of a safety-bicycle having this improved duplex driving-gear. Fig. 2 is a face elevation of the duplex driving-gear with dust-cover removed, the parts being shown removed from the bicycle and upon an enlarged scale. Fig. 3 is a face view and section of the locking-plate in its released position. Fig. 4 is a plan view, partly in section, showing the improved duplex driving-gear, a section of which is taken on the radii *a* and *b* of Fig. 2. Fig. 5 is a partial face view of the dust-cover.

The crank-disk B is firmly attached at A' and A² to the pedal-crank A, and it carries pintles or center pins B' for the toothed pinions C, each of which gears into a central toothed shell D on ball-bearings D' and into the internal teeth of the rim-wheel or sprocket E, thus holding said rim-wheel concentric with the pedal-spindle. A locking-plate F has slot-guides F' on pintles B² on disk B, and this plate has bearing piece or flange F², key-piece F⁵, and toothed sector F³ and bears against a spring F⁴, adapted to retain said toothed sector F³ in gear with the central toothed wheel D and the key-piece F⁵ in engagement with way or slot D² and so cause said wheel D to revolve with the disk B, as do the pinions C, without revolving the said pinions C. In this position the motion of the pedal-cranks A is imparted to the rim-wheel or sprocket E without multiplication, and thus the low gearing is provided. The locking-pin G is carried by bands or clips G² around the hanger-bracket or other convenient part, and it has a spring G', adapted to press it toward and into the driving-gear; but the action of said spring-pin is controlled by connections hereinafter described. When the control is released, the spring G' forces the pin G on the inside or dust cover H, in which there is slot or opening H', through which protrudes the bearing piece or flange F² of locking-plate F. The pin G, catching on the inside of this piece F², forces it outwardly from the center, and thus moves plate F into the position shown by dotted lines, Fig. 2, and by full lines, Fig. 3. This releases wheel D from the sector F³ and from the key F⁵; but as said wheel D revolves it brings under pin G the keyway or socket D, into which said pin finds its way, (see Fig. 3,) and thus stops further revolution of said wheel D. The wheel D not revolving, the pinions C, carried on disk B, as they pass around said wheel D, are caused to revolve and give motion to rim-wheel or sprocket E independent of the motion of disk B and very much faster than it. Thus is provided the high gearing. To change from the high to the low, the pin G is withdrawn, (against the impulse of spring G',) and thus freeing the wheel D to revolve and allowing the plate F by the force of spring F⁴ to again lock it to the disk B.

The operating connections consist of draw-piece J', bell-crank J², cord or rod or chain J³, bell-crank J⁴, cord or rod or chain J⁵, and a handle-lever J, the depression of which handle J will withdraw the pin G, so that the low gearing will be normal gearing, though it might be conversely arranged.

Having now particularly described and ascertained the nature of my said invention and in what manner the same is to be performed, I declare that what I claim is—

1. In duplex driving-gear, the combination with a rim-wheel or sprocket, of pinions having their journal-supports upon a disk on the crank-shaft, and meshing with the rim-wheel, a toothed wheel centrally arranged and meshing with said pinions, a locking-plate moving in unison with the disk and having a toothed sector and a key adapted to engage with the centrally-arranged toothed wheel and cause it to rotate with the disk, and a locking-pin mounted on a rigid support and adapted to engage with and be disengaged from the central toothed wheel, substantially as described.

2. In duplex driving-gear for bicycles the combination with a rim-wheel having internal gear-teeth and external sprocket-teeth, of pinions meshing with the gear-teeth, a disk on the crank-shaft having journal-supports for said pinions, a central toothed wheel on said crank-shaft meshing with the pinions, a locking-plate moving with the disk and having a toothed sector normally held by a spring in mesh with the central toothed wheel, said locking-plate being also provided with a key to engage the central toothed wheel and cause it to revolve with the disk, a spring-pressed locking-pin mounted on the bicycle-frame to engage the said toothed wheel and arrest its revolution and means for withdrawing said locking-pin, substantially as described.

Dated this 26th day of November, 1897.

WILLIAM JAMES THOMPSON.

Witnesses:
FRED WALSH,
PERCY NEWELL.